UNITED STATES PATENT OFFICE.

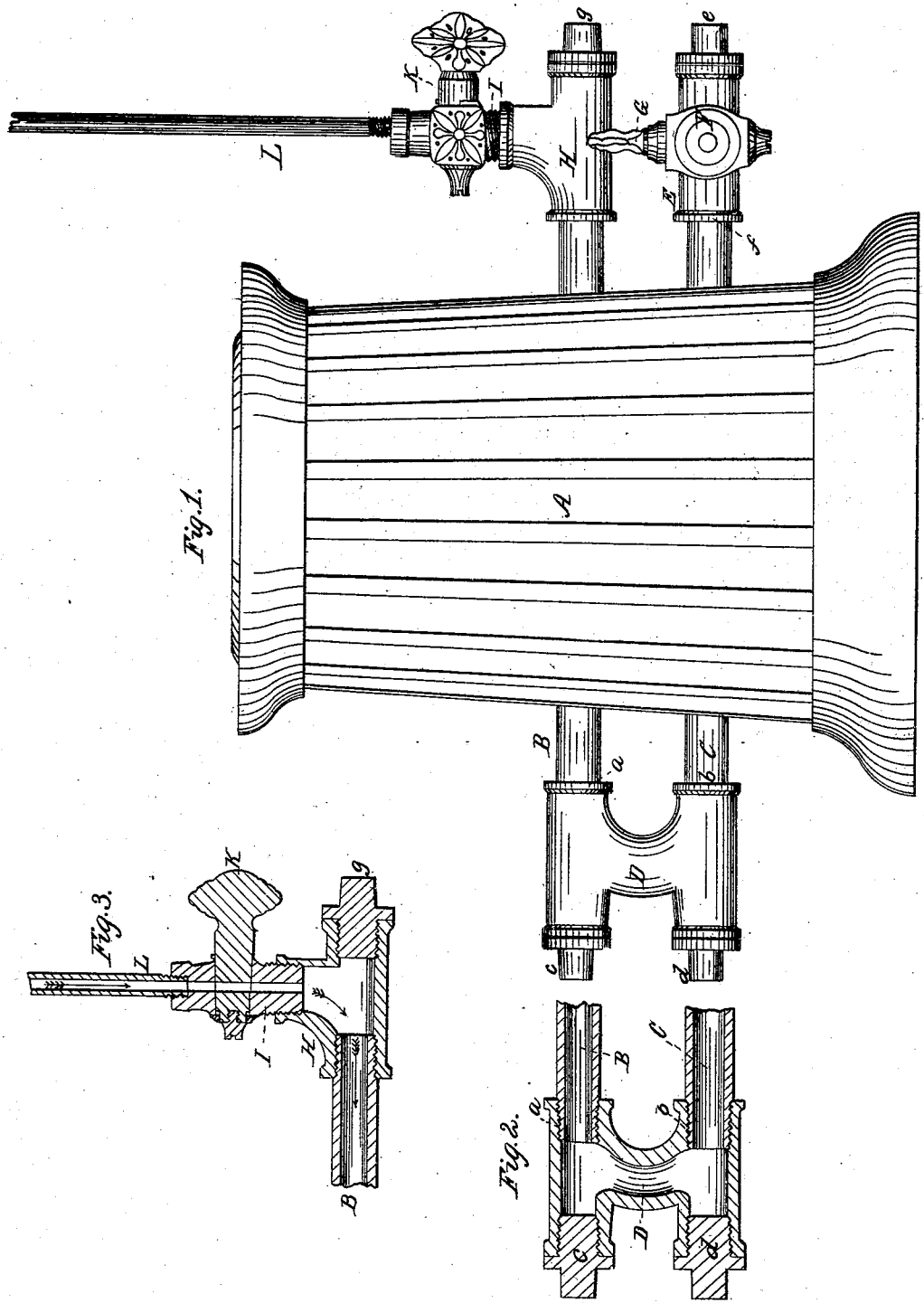

WARREN A. SIMONDS, OF BOSTON, MASSACHUSETTS.

PORTABLE GAS-GENERATOR.

Specification of Letters Patent No. 18,109, dated September 1, 1857.

*To all whom it may concern:*

Be it known that I, WARREN A. SIMONDS, of Boston, in the county of Suffolk and State of Massachusetts, have invented certain Improvements in Portable Gas Apparatus, of which the following is a full, clear, and exact description, reference being had to the accompanying drawings, making part of this specification, in which—

Figure 1, is a view of an ordinary stove with my gas generating apparatus attached. Figs. 2, and 3 details to be referred to.

The object of my present invention is to obtain a cheap portable apparatus for generating illuminating gas, which can be either used with a fire kept up expressly for the purpose of generating gas, or can be used in connection with any fire used for heating or cooking purposes.

In the drawings A, represents an ordinary stove through suitable holes in the sides of which, pass horizontally two pipes B, and C, one placed a short distance above the other; the lower one C, being in immediate contact with the hottest part of the fire and the upper one B, a little higher up. These pipes are connected together at one end outside of the stove and are braced by the half turn D, the pipes communicating (see Fig. 2) the pipe B, screwing into it at $a$, and the pipe C, at $b$. The casting D, is also furnished with openings in line with the axis of the two pipes B, and C, that are closed by screw plugs $c$, and $d$. To the other end of the pipe C, is attached by a screw at $f$, another casting or elbow E, with an opening in line with the pipe, closed by a screw plug $e$; from this casting E, projects at right angles to the pipe C a short piece of pipe F, with a stop cock G. This pipe conducts the gas as it is formed, to the purifier.

As the purifier and reservoir are similar to those in use, and form no part of my invention, they need not be described.

To the end of the pipe B, is screwed an elbow or casting H, (seen in section Fig. 3) similar to that on the pipe C, with an opening in line with the pipe, that is closed by the screw plug $z$. To the elbow H, is screwed the short piece of pipe I, with its stop cock K; from this piece rises vertically the feed pipe L, through which the rosin oil, animal oil, liquid fat, or other suitable material is forced in intermittent jets by a pump which may be driven by hand or by suitable mechanism driven by a spring or weight.

Operation: The pipes B, and C, having become sufficiently heated, a jet of oil, is forced by the pump through the pipe L as indicated by the arrows into the pipe B, where it comes in contact with the hot pipe and is converted into an imperfectly formed gas or vapor, thence this vapor passes through the half turn D, into the pipe C, where it is still further heated and converted into gas which passes off through the pipe F, and cock G, to the purifier. The jets of oil are made intermittent, the rapidity with which they succeed each other, and their volume depending on the intensity of the fire and the rapidity with which the oil is consumed and converted into gas. The oil is almost entirely consumed in the pipes B, and C, leaving but a slight deposit or residuum of soot in the pipes; this necessitates the cleaning out of the pipes at intervals of time (say once in five or six hours) where the manufacture is continuous. To do this the pump is stopped, the stop cock K, is closed, and as soon as the last jet of oil has worked off, the cock G, is closed to prevent the gas from forcing back out of the purifier, then the screw plugs $c$, $d$, $e$, and $g$, are taken out and a rod with a wire brush or scraper on the end of it is passed longitudinally through the pipes B, and C, to clear them of any deposit which may have collected; when the plugs can be replaced and the operation proceed with the detention of but a few moments.

Although the animal oils and fats kept liquid are well adapted for the purpose of generating illuminating gas in my improved appartus yet I prefer rosin oil on account of its cheapness and limpid state.

What I claim as my invention and desire to secure by Letters Patent is—

The tubular retorts B and C of the form herein described, operating in the manner substantially as set forth for the manufacture of oil gas.

WARREN A. SIMONDS.

Witnesses:
 THOS. R. ROACH,
 P. E. TESCHEMACHER.